Patented May 24, 1932

1,859,279

UNITED STATES PATENT OFFICE

ALFRED L. CHAMBERLAIN, OF PORT HURON, MICHIGAN, ASSIGNOR OF ONE-EIGHTH TO GEORGE B. WILLCOX, OF SAGINAW, MICHIGAN

MANUFACTURE OF PRECOOKED LEGUME FOOD PRODUCTS

No Drawing. Application filed June 27, 1929. Serial No. 374,287.

This invention relates to food products and pertains more particularly to pre-cooking legumes.

The object of the invention is to provide a method whereby whole beans or peas, or split beans or peas, or lentils etc. can be prepared as a food-base for marketing in packages in such condition that the user can easily and quickly prepare them for the table. For example, whole beans can be prepared according to this method so as to have the shape and general appearance of ordinary uncooked beans, but are capable of being converted for table use into high grade baked beans with only twenty to thirty minutes of baking. The protein of the bean is changed and rendered easily digestible, after this short cooking, and as satisfactory a product is made as can be produced by the ordinary cooking of dried beans in ten or twelve hours.

Material prepared according to this invention, instead of being marketed whole, as above described, may be ground into a powder and marketed in that condition. It makes a base for soups etc. that can be cooked ready to serve in five to ten minutes.

Split peas can be prepared by this process so they can be cooked ready for table use as split-pea soup, or as baked peas, with only ten minutes of kitchen cooking for the former and thirty for the latter.

The claimed invention relates to a specific mode of treatment of so-called dried beans, peas or lentils, to produce a new and useful article of food that requires only a few minutes' cooking to prepare for the table, instead of several hours as heretofore. In other words, the process is not merely one of cooking, but it is of cooking particular materials under special circumstances whereby a novel product ready for kitchen use is produced.

Through extensive experimentation and laboratory work I have discovered that peas, beans and lentils and similar legumes that have been pre-cooked under pressure and dried under certain conditions can be prepared for the table with only a small amount of subsequent kitchen cooking. Such experimentation has developed certain novel control factors of time, temperature, moisture content etc., as will be set forth in the specification.

For purposes of description I shall explain the method as applied to split peas which have already been air-dried or artificially dried to the condition ordinarily known in the market as "dried peas".

In carrying out my method I soak the dried peas in cold water until they are impregnated with water. Appropriate soaking ordinarily takes place in approximately eight hours. Then the soaked material is drained. The material is then cooked under about fifteen pounds steam pressure, that is, ranging between fourteen and twenty pounds, and at a temperature of from two hundred forty-eight to two hundred sixty degrees Fahrenheit, in a pressure cooker for approximately one hour, that is, ranging from three quarters of an hour to one and one quarter hours. The cooked peas are then removed from the cooker and drained. They are then dried in a drier at about one hundred twenty degrees Fahrenheit for approximately eight hours, which brings them to a moisture content of approximately twelve to fourteen per cent.

Beans and peas cooked and dried in this way retain their original shape and size and practically their original color, and will keep indefinitely in almost any climate.

This pre-cooked and dried material is a food-base that can be prepared for the table by merely soaking in cold water over night, and cooking for ten minutes.

Any suitable flavoring, such as onion juice, can be incorporated by soaking the cooked-and-dried peas in water and onion juice liquor, re-drying, and packaging for the market. An alternative method of introducing flavor is that of adding onion juice and water to the pressure-cooked peas just as they come from the cooker and subjecting them to a partial vacuum for about one half hour while heating to a temperature somewhat less than two hundred twelve degrees Fahrenheit. A satisfactory degree of vacuum is twenty-four inches of mercury. The peas are then drained and dried to about twelve percent moisture content. Tests show that this method gives a complete penetration of the flavoring liquid through the cooked peas.

The pressure cooking after soaking in water changes the starch in the fresh peas or beans to dextrin and possibly to some other form of carbohydrate and renders the protein more easily digestible. Under a steam pressure of fifteen pounds per square inch this conversion is attained without breaking up or changing the shape of the beans or peas. Moreover, the preliminary cooking is done more completely in a shorter period of time than is possible with atmospheric cooking.

By the means above described I have developed a method that does not materially alter the appearance of air-dried beans or peas, yet leaves them in condition for shipment and storage without liability of spoiling, and the finished product, by merely undergoing a preliminary soaking over night, can be converted, by ten to thirty minutes of kitchen cooking, into soup, baked beans or baked peas.

If desired the precooked and dried material can be ground into powder, in which event it can be properly cooked as soup material in about five to ten minutes time.

Having thus described my invention, what I claim and desire to secure by Letters Patent is:

The method of preparing leguminous seeds for marketing in partially pre-cooked condition, which consists in first soaking the legumes in water for approximately eight hours, then cooking for one hour under steam pressure of approximately fifteen pounds per square inch, draining, adding a flavoring liquid, subjecting the material to partial vacuum while heating to a temperature of one hundred twenty degrees Fahrenheit for approximately one half hour and finally drying at a temperature of one hundred twenty degrees Fahrenheit to a moisture content of approximately twelve per cent, whereby there is produced a product consisting of dried leguminous seeds which retain the characteristic shape of the original seeds, but are adapted to be conditioned for table use by re-soaking and cooking for thirty minutes at atmospheric pressure.

In testimony whereof, I affix my signature.

ALFRED L. CHAMBERLAIN.